United States Patent Office 3,069,934
Patented Dec. 25, 1962

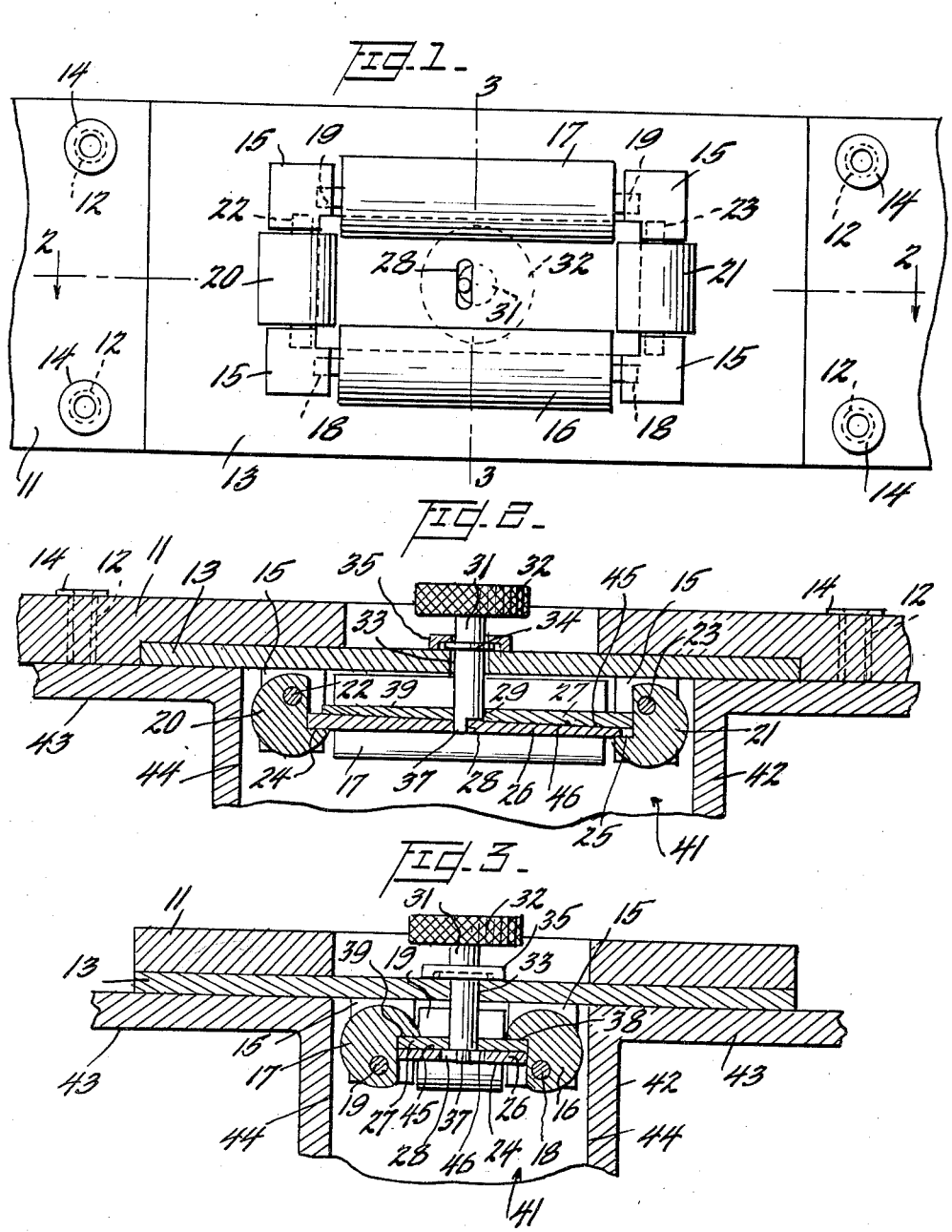

3,069,934
JIG CENTERING DEVICE
Gus Lunsford, El Paso, Tex., assignor to Western Electric Company, Incorporated, a corporation of New York
Filed Nov. 7, 1961, Ser. No. 150,687
6 Claims. (Cl. 77—62)

This invention relates to a jig centering device and more particularly to a device for centering a drill jig with respect to an aperture formed in a workpiece.

In the mating of waveguide sections it is critically important that the inner walls of each section coincide with the inner walls of an opposing section. Hence the alignment of fastener-receiving apertures of opposing waveguide flanges is also critical. Presently, a problem has arisen in aligning and centering a drill jig utilized in drilling the apertures of the waveguide flange.

One object of this invention is to provide a new and improved jig centering device.

Another object is the provision of a simple and efficient centering device having eccentrics that are moved into the walls of an aperture to locate a fabricating fixture with respect to the aperture.

A further object of this invention is to provide a device for centering a drill jig about an opening wherein the manipulation of a pair of inclined planes moves a series of centering elements into engagement with the walls of the opening.

A still further object of this invention is the novel cooperation of a first pair of rollers with a second pair of rollers to engage the inner walls of a tubular member, thereby centering a drill jig.

With these and other objects in mind, the present invention contemplates a drill jig positioned and centered by two pairs of opposed, eccentrically mounted rollers arranged to be positioned and manipulated within a rectangular opening of a flanged tube. A pair of plates having inclined surfaces on one side are mated together at the inclined surfaces and held between horizontal cutaway sections of the rollers and are manually controlled to urge pivotal motion of the rollers. In one use of the invention, the rollers are positioned within a rectangular opening of a flanged tube, whereafter the inclined plates are manually moved and the rollers are pivoted against the inner walls of the tube, thereby centering the drill jig on the flanged section. With this arrangement, apertures can be drilled in the flanged sections of separate tubes, and the tubes may be mated with the assurance of proper alignment of the drilled apertures and hence proper alignment of the inner walls of the tube.

Other objects and advantages of the invention will become apparent by reference to the following detailed description and the accompanying drawings illustrating a preferred embodiment thereof, in which:

FIG. 1 is a bottom plan view of a jig centering device for centering a jig plate embodying the principal features of the present invention;

FIG. 2 is a cross-sectional view taken on line 2—2 of FIG. 1 showing the jig centering device positioned within a rectangular opening of a flanged tube with inclined plates resting on cutaway sections of a first pair of spaced, parallel rollers; and FIG. 3 is a cross-sectional view taken on line 3—3 of FIG. 1 showing the inclined plates abutting the underside of cutaway sections of a second pair of spaced, parallel rollers.

Referring now in detail to the drawings, in FIG. 1 a drill jig plate 11, having apertures 12, is mounted on a back plate 13. The apertures 12 are provided with drill bushings 14 for accurately guiding drill bits therethrough. Additionally, four stationary or trunnion blocks 15 are mounted on and depend from the underside of back plate 13. A pair of spaced, parallel rollers or eccentrics 16 and 17 are eccentrically mounted on shafts 18 and 19, respectively, where the shafts are contained within trunnions 15. A second pair of spaced, parallel rollers or eccentrics 20 and 21 are mounted on shafts 22 and 23, respectively, where the shafts are also contained within the blocks 15. The first pair of parallel rollers 16 and 17 are perpendicularly positioned with respect to the second pair of parallel rollers 20 and 21, as shown in FIG. 1.

Referring now to FIG. 2, rollers 20 and 21 are cut out to form horizontal shelves 24 and 25, respectively. Resting on the horizontal shelves 24 and 25 are a pair of plates or slides 26 and 27 having inclined surfaces 45 and 46, respectively. An elongated slot 28 is formed centrally in plate 26, while an aperture 29 is formed centrally in plate 27. A shaft 31, having a knurled knob 32 at one extremity, is loosely positioned within an aperture 33 of back plate 13. Mounted midway on the shaft 31 is an annular washer 34 contained loosely within an enclosure 35 wherein the enclosure is mounted on the back plate 13. At the opposite extremity of shaft 31 is a projection 37 formed eccentric with respect to the axis of the shaft and which is contained within the slot 28 of the plate 26.

Referring now to FIG. 3, the second pair of rollers 16 and 17, formed with inverted horizontal shelves 38 and 39, respectively, are in an opposed relation similar to the arrangement of rollers 20 and 21, as previously described. It is to be noted in FIG. 3 that the inclined surfaces 45 and 46 of the plates 26 and 27, respectively, reveal a linear combined cross section.

As shown in FIGS. 2 and 3, the plates 26 and 27 are contained within an enclosure wherein the underside of plate 26 abuts horizontal shelves 24 and 25 of rollers 20 and 21, respectively, and the topside of plate 27 abuts the horizontal shelves 38 and 39 of rollers 16 and 17, respectively. It is to be noted that plate 27 assumes a fixed position initially due to the force exerted on the plate by the rollers 16 and 17. In addition, the inclined surfaces 45 and 46 of plates 26 and 27, respectively, are slidably mated to provide a varying combined cross section which is uniform at any given instant.

In operation, the jig centering device is positioned within a rectangular opening 41 of a waveguide 42 having a flanged section 43. It is to be noted that the outer edges of the back plate 13 and the jig plate 11 will then rest upon the upper surface of flange 43. The knob 32 is manually rotated, thereby rotating shaft 31 and eccentric projection 37. Upon rotation of eccentric projection 37, the plate 26 is relatively moved with respect to plate 27 along a plane coincident with the inclined surfaces 45 and 46 by the cooperation of the eccentric projection 37 with the slot 28. As seen in FIG. 2, rotation of eccentric projection 37 moves plate 26 to the right. The relative movement between plates 26 and 27 in the manner just described increases the combined thickness of the plates. Since the plates 26 and 27 are contained within the horizontal shelves of the rollers 16, 17, 20, and 21, and the plate 27 is in a relatively fixed position, a vertical force is asserted downwardly upon horizontal shelves 24 and 25 to rotate roller 20 clockwise and roller 21 counterclockwise about shafts 22 and 23, respectively. Therefore, upon rotation, rollers 20 and 21 will engage the inner walls 44 of the waveguide 42. Continued rotation of the knob 32, and hence the shaft 31, provides additional movement for the plate 26 in the same manner as previously described. Thus, as shown in FIG. 3, a vertical force is asserted upwardly on the inverted horizontal shelves 38 and 39 thereby rotating roller 16 in a counterclockwise direction about shafts 18 and 19, respectively. The rollers then engage the inner walls 44 of the waveguide 42, thereby centering trunnions 15 in the opening 41, and hence the drill jig about the opening of the waveguide.

Thus, it is easily seen that the centering device accurately locates points on the flange 43 with respect to the waveguide aperture 41, such that a rotating drill may be positioned through the drill bushings 14 to form apertures in the desired locations of the flange.

It is to be understood that the above-described arrangements are simply illustrative of an application of the principles of the application. Numerous other arrangements may be devised by those skilled in the art which will embody the principles of the invention and will fall within the spirit and scope thereof.

What is claimed is:

1. A centering device comprising a base plate, a pair of eccentrics having cutout portions, means for rotatably mounting said eccentrics on said base plate with the axes in parallel relationship and the cutout portions facing each other, a pair of slides having abutting inclined surfaces supported in said cutout portions of said eccentrics, means interposed between said slides and said base plate for precluding movement of the slides toward said base plate, and means for moving said slides relative to each other along said inclined surfaces to rotate said ecentrics.

2. A centering device comprising a base, a pair of spaced and parallel rollers, means for eccentrically mounting the rollers on the base, each of said rollers cut out to form a horizontal shelf, a member positioned on and bridging the horizontal shelves of the rollers, and means for moving the member to exert a force on the horizontal shelves of the rollers thereby rotating the rollers.

3. In a centering device, a base, a first pair of spaced and parallel rollers, a second pair of spaced and parallel rollers, means for eccentrically mounting for rotation the first and second pair of rollers on the base, said first pair of rollers positioned perpendicular to the second pair of rollers, means for engaging and urging rotation of the first and second pair of rollers, and means for actuating the engaging means to rotate the first and second pair of rollers.

4. A device for centering a jig in a rectangular opening which comprises a base, a first pair of spaced rollers mounted on the base and having parallel eccentric axes, a second pair of spaced rollers mounted on the base and having parallel eccentric axes, said axes of the first pair of rollers mounted perpendicular to the axes of the second pair of rollers, a pair of stacked and inclined plane plates positioned between and in engagement with the first and the second pair of rollers, said plates having apertures formed centrally therein, an adjusting shaft having an eccentric projection at one extremity positioned within the aperture of one of the plates, and means for rotating the shaft to relatively move the plates, thereby forcing the plates against the rollers to urge the rollers against the walls of the rectangular opening.

5. In a device for locating a jig with respect to an aperture of a rectangular tube, a base, a first pair of spaced parallel rollers, means for eccentrically mounting the first pair of rollers on the base, a second pair of spaced parallel rollers, means for eccentrically mounting the second pair of rollers on the base, said first pair of rollers positioned perpendicular to the second pair of rollers, each of said first pair of rollers cut out to form a horizontal shelf, each of said second pair of rollers cut out to form an inverted horizontal shelf located in a plane spaced above a plane of the shelves of the first pair of rollers, a first plate having a linear undersurface and an inclined upper surface, said undersurface of the first plate positioned on and bridging the horizontal shelves of the first pair of rollers, a second plate having an inclined undersurface and a linear upper surface, said inclined undersurface of the second plate slidably positioned on and mated with the inclined upper surface of the first plate and engaging and bridging the inverted horizontal shelves of the second pair of rollers, said first plate having an elongated slot formed therein, said second plate having a central aperture formed therein and coinciding with the slot of the first plate, an adjusting shaft having an eccentric projection at one extremity positioned through the aperture of the second plate into the slot of the first plate, and means for rotating the shaft to provide relative motion between the first and second plates, thereby applying a force to the horizontal shelves of the first and second pairs of rollers to urge rotation of the rollers.

6. In a centering device, a base, a first and second pair of opposed eccentrics, means for rotatably mounting the eccentrics on the base with their axes parallel to the base, means on said first pair of eccentrics for receiving an upward force, means on said second pair of eccentrics for receiving a downward force, and means for imparting an upward and downward force to said means to rotate said eccentrics.

References Cited in the file of this patent
UNITED STATES PATENTS
2,666,266     Sinhel _____ Jan. 19, 1954